United States Patent [19]

Kojima

[11] 4,433,416
[45] Feb. 21, 1984

[54] PCM SIGNAL PROCESSOR

[75] Inventor: Tadashi Kojima, Yokosuka, Japan

[73] Assignee: Tokyo Shibaura Denki Kabushiki Kaisha, Japan

[21] Appl. No.: 300,738

[22] Filed: Sep. 10, 1981

[30] Foreign Application Priority Data

Sep. 16, 1980 [JP] Japan .................................. 55-128331

[51] Int. Cl.³ ............................................ G06F 11/10
[52] U.S. Cl. ........................................ 371/37; 360/32; 371/38; 371/40
[58] Field of Search ............................ 371/38, 40, 37; 360/38.1, 32, 53

[56] References Cited

U.S. PATENT DOCUMENTS

| | | | |
|---|---|---|---|
| 4,211,997 | 7/1980 | Rudnick et al. ........................ | 371/38 |
| 4,215,335 | 7/1980 | Doi et al. ................................ | 371/69 |
| 4,227,221 | 10/1980 | Kanazawa ............................... | 360/32 |
| 4,238,852 | 12/1980 | Iga et al. ................................ | 371/40 |
| 4,282,551 | 8/1981 | Kanazawa et al. ...................... | 360/32 |
| 4,306,305 | 12/1981 | Doi et al. ................................ | 371/38 |
| 4,309,721 | 1/1982 | Christopher ....................... | 358/128.5 |
| 4,371,270 | 1/1983 | Yamada ................................. | 371/38 |

OTHER PUBLICATIONS

Doi et al., A Long-Play Digital Audio Disk System, Journal of the Audio Eng. Soc., Dec. 1979, vol. 27, No. 12, pp.975-981.
Patent Abstracts of Japan, vol. 4, No. 90, P17 572 (Jul. 27, 1980), Japanese Patent No. 55-52515.
Ishida et al., "A Rotary-Head PCM Recorder Employing Error Correction Technique," IEEE Transaction on Consumer Electronics, vol. CE-24, No. 4, pp. 526-533 (Nov. 1978).
"Consumer Use PCM Encoder-Decoder 1979-6" Journal of Audio Engineering Society, vol. 28, No. 4, pp. 260-265 (Apr. 1980).

Primary Examiner—Charles E. Atkinson
Attorney, Agent, or Firm—Finnegan, Henderson, Farabow, Garrett & Dunner

[57] ABSTRACT

A pulse code modulation signal processor extracts signal processor control words from a serial pulse code modulation data stream also containing error detection and correction codes. The PCM signal processor includes a serial-to-parallel converter to convert the serial PCM data stream into the signal processor control words in a parallel format, an error detector connected to the serial-to-parallel converter for forming an error signal indicating the presence or absence of an error in the control words, registers for storing first signal processor control words when the error signal indicates the absence of an error in the signal processor control words and for preventing the storage of the signal processor control words when the error signal indicates the presence of an error in the signal processor control words, and a transient error correction circuit for storing second signal processor control words when the error signal first indicates the presence of an error and subsequently indicates the absence of an error and when the second control signals of two successive PCM data streams are equivalent.

4 Claims, 6 Drawing Figures

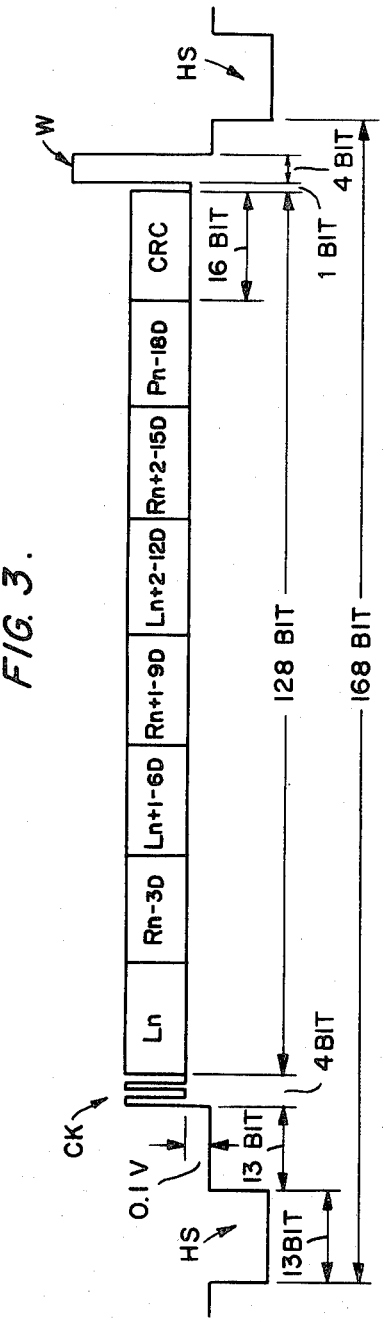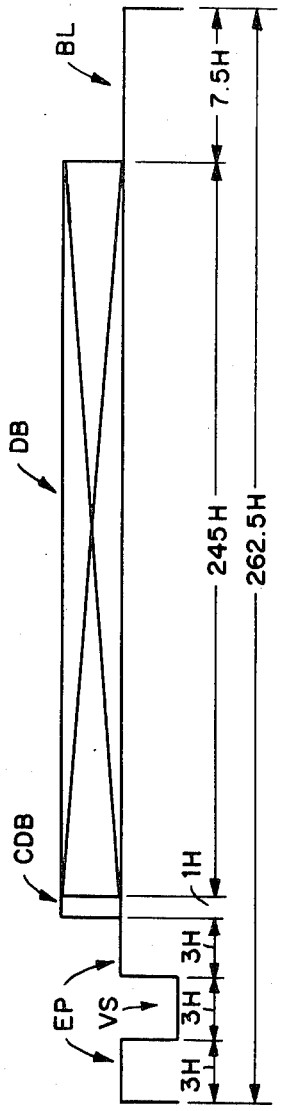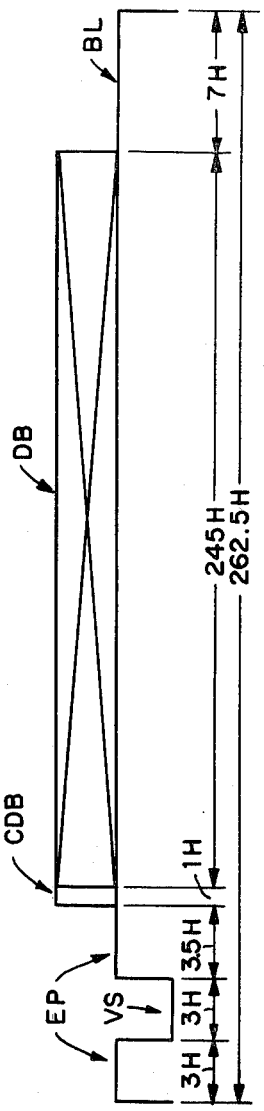

PCM SIGNAL PROCESSOR

FIELD OF THE INVENTION

This invention relates to a PCM (pulse code modulation) signal processor, and more particularly, to a PCM signal processor for a PCM audio signal decoder used with a VTR (video tape recorder).

BACKGROUND OF THE INVENTION

In the field of audio engineering, digital technology has been used most often in the design of professional equipment. Recently, consumer video cassette tape recorders have incorporated digital technology and movement toward using digital technology in consumer audio equipment appears to be accelerating.

A major reason for this trend is that the PCM recording and playback system, which is made possible by combining a video tape recorder (VTR) with digital technology, has a much broader dynamic range than do conventional analog tape recorders. Another reason is that in comparison with those conventional recorders, the PCM system has practically no wow and flutter. Also, the PCM systems' frequency and distortion characteristics are substantially superior to those of analog systems.

A PCM audio system connected to a VTR requires a digital signal processor to transform the PCM signal format to and from the appropriate television signal format. The format for the PCM audio signal may be the one prescribed by the EIAJ (Electronic Industries Association of Japan) Technical File: STC-007, which employs bit error correction schemes together with interleaving techniques. This format will be described in detail below.

Encoded PCM audio signals in a TV signal format contain various control signals as well as the PCM audio signals. The control signals are used to control the PCM decoders, as will be explained below.

Conventional PCM signal processors for decoding encoded PCM signals do not adequately detect and correct errors in the control signals. One reason for this inadequacy is that conventional signal processors use the same techniques to correct control signals as to correct audio signals, and those techniques do not work well for control signals.

SUMMARY OF THE INVENTION

It is, therefore, an object of the present invention to reduce the malfunctions of error correction in a PCM signal processor.

According to the present invention, the PCM signal processor for extracting signal processor control words from a serial PCM data stream also containing error detection and correction words comprises: serial-to-parallel converter means for converting the serial PCM data stream into a parallel form, the serial-to-parallel converter means including terminals for outputting the signal processor control words; error detecting means responsive to the error detection and correction codes and connected to the serial-to-parallel converter means terminals for forming an error signal having a first state indicating the presence of an error in the control words and a second state indicating the absence in a error in the control words; means for storing first signal processor control words when the error signal is in the second state and for preventing the storage of the first signal processor control words when the error signal is in the first state, the storing means containing signals for the PCM signal processor; and transient error correction means for storing second signal processor control words when the error signal is initially in the first state and subsequently in the second state, and when the second signal processor control words of two successive PCM data streams are equivalent.

Additional objects and advantages of the present invention will become apparent to persons skilled in the art from the following detailed description and the accompanying drawings.

BRIEF DESCRIPTION OF THE DRAWINGS

FIG. 3 shows another type of word signal allocation for a horizontal scanning period;

FIG. 4A shows a signal allocation for an odd vertical field of a TV signal;

FIG. 4B shows a signal allocation for an even vertical field of a TV signal.

DESCRIPTION OF THE PREFERRED EMBODIMENT

The present invention will be described in detail with reference to the accompanying drawings FIG. 1 to FIG. 5. Throughout the drawings, like reference letters and numerals will be used to designate like or equivalent elements.

Before describing the invention, it is necessary to describe the EIAJ signal format. This will be done by referring to FIG. 1 through FIG. 4B.

When PCM encoding analog audio signals, two channels of stereophonic analog signals (L and R) are individually sampled at about 44 kHz. Each sample becomes a 14-bit or 16-bit PCM data word in a video signal portion of the standard television (TV) signal.

Figure 1:
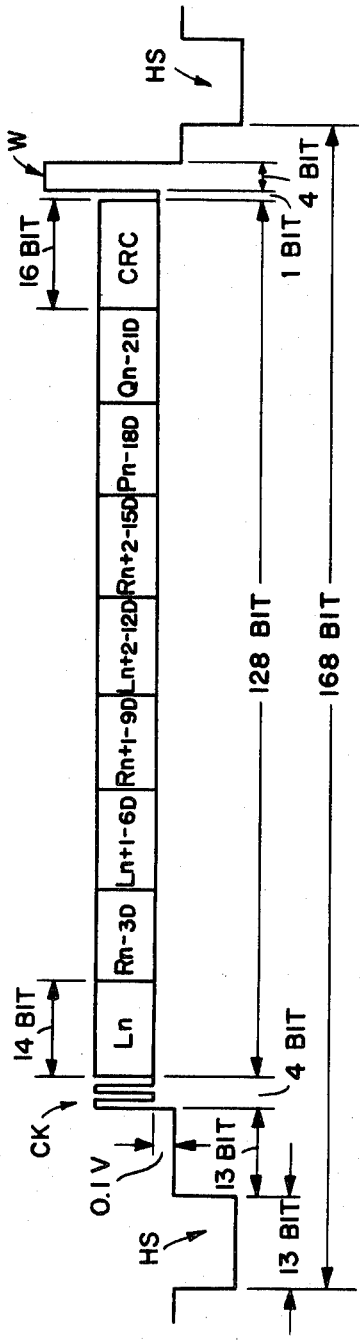
FIG. 1 shows one type of word signal allocation according to the EIAJ format for a horizontal line scanning period of a TV signal.

FIG. 1 shows an example of a waveform and data format of one horizontal scanning period (1H period) when the sample becomes a 14-bit data word. Each video signal block in a single horizontal lime contains six PCM data words (three data words per channel: $L_n$, $R_{n-3D}$, $L_{n+1-6D}$, $R_{n+1-9D}$, $L_{n+2-12D}$ and $R_{n+2-15D}$) with two check words ($P_{n-18D}$ and $Q_{n-21D}$) for error correction, and one CRC word for error detection. These words form a 9-word, 128-bit data block (DB) for each horizontal scanning period.

The CRC word consists of 16 bits, but all other words are 14 bits. The PCM data words shown in FIG. 1 as L and R correspond respectively to the left and right channels of the sampled data. The suffixes represent the number of the sample in the sampling order.

In the format shown in FIG. 1, the data is interleaved such that each data word, i.e., the six PCM data words and the two check words are successively shifted 16 blocks (or equivalently 16 horizontal lines). The latter D in the suffixes of the sample data words in FIG. 1 represents both the number of blocks of the interleave and the equivalent amount of time necessary to transmit that number of blocks. In this case, the number of blocks of the interleave is 16, which is equivalent to a word-interleave of 3D=48 words.

The horizontal line (1H) in FIG. 1 is 168 bits long. This 168-bit line comprises a 13-bit long horizontal sync signal HS, followed by an interval of 13 bits, then a 4-bit clock signal CK for synchronization of data. The code of the data synchronization signal CK is "1010." The 128-bit data block described above is next, followed by a single bit representing a "0," a white reference signal W of 4 bits and a 5-bit long null signal.

Figure 2:
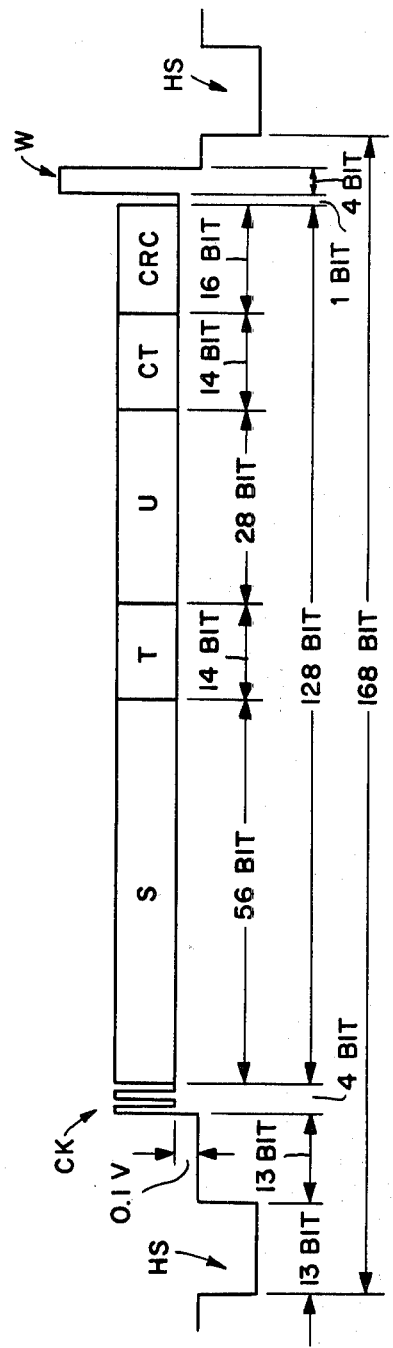
FIG. 2 shows a control signal allocation for the horizontal scanning period.

FIG. 2 shows a 1H horizontal line containing a control signal data block (CDB). This format is the same as that of FIG. 1 except the 128-bit data block in FIG. 1 is replaced by a 128-bit control data block. The 128-bit control data block in this case comprises a 56-bit heading signal word S, a 14-bit content discrimination signal word T, a 28-bit address signal word U, a 14-bit control signal word CT, and the previously mentioned 16-bit CRC error detection word.

The content of the 14-bit control signal word CT is shown in Table 1.

TABLE 1

| Bit No. | Code Content | Control content | Bit content |
|---|---|---|---|
| 1 to 10 | No prescription | — | 0 |
| 11 | Dubbing inhibition code | Absent | 0 |
| 12 | P correction discrimination code | Present | 0 |
| 13 | Q correction discrimination code | Present | 0 |
| 14 | Pre-emphasis discrimination code | Present | 0 |

In Table 1, the Q correction discrimination code is "0" representing "presence" when each word of the PCM audio signal is 14 bits as shown in FIG. 1. When each word comprises 16 bits, the data format shown in FIG. 3, the Q correction discrimination code is "1" representing "absence."

FIG. 3 shows an example of the data block in which each sample data word of the PCM audio signal is 16 bits. In this case, the 128-bit data block comprises six 16-bit words (three left and three right channel audio signals), a 16-bit error correction word P and a 16-bit CRC error detection word, for a total of eight words.

The above data signals for 1H horizontal lines are arranged in a vertical scanning field as shown, for example, in FIGS. 4A and 4B. FIG. 4A corresponds to an odd field and FIG. 4B corresponds to an even field.

Each field begins with an equivalent pulse EP, a vertical sync signal VS, and another EP. The control signal block CDB (see FIG. 2) is the 10th horizontal line in the odd field (see FIG. 4A) and the 10.5th horizontal line in the even field (see FIG. 4B). After the CDB, there are 245 horizontal lines (see FIGS. 1 and 3) in the data block DB. The remaining horizontal lines constitute a blank period BL.

Of the 262.5 horizontal lines constituting one vertical field in FIGS. 4A and 4B, the 16.5 lines which do not contain the control signal block CDB or one of the 245 lines in the data block DB correspond to the vertical blanking period of the standard television signal.

Figure 5:
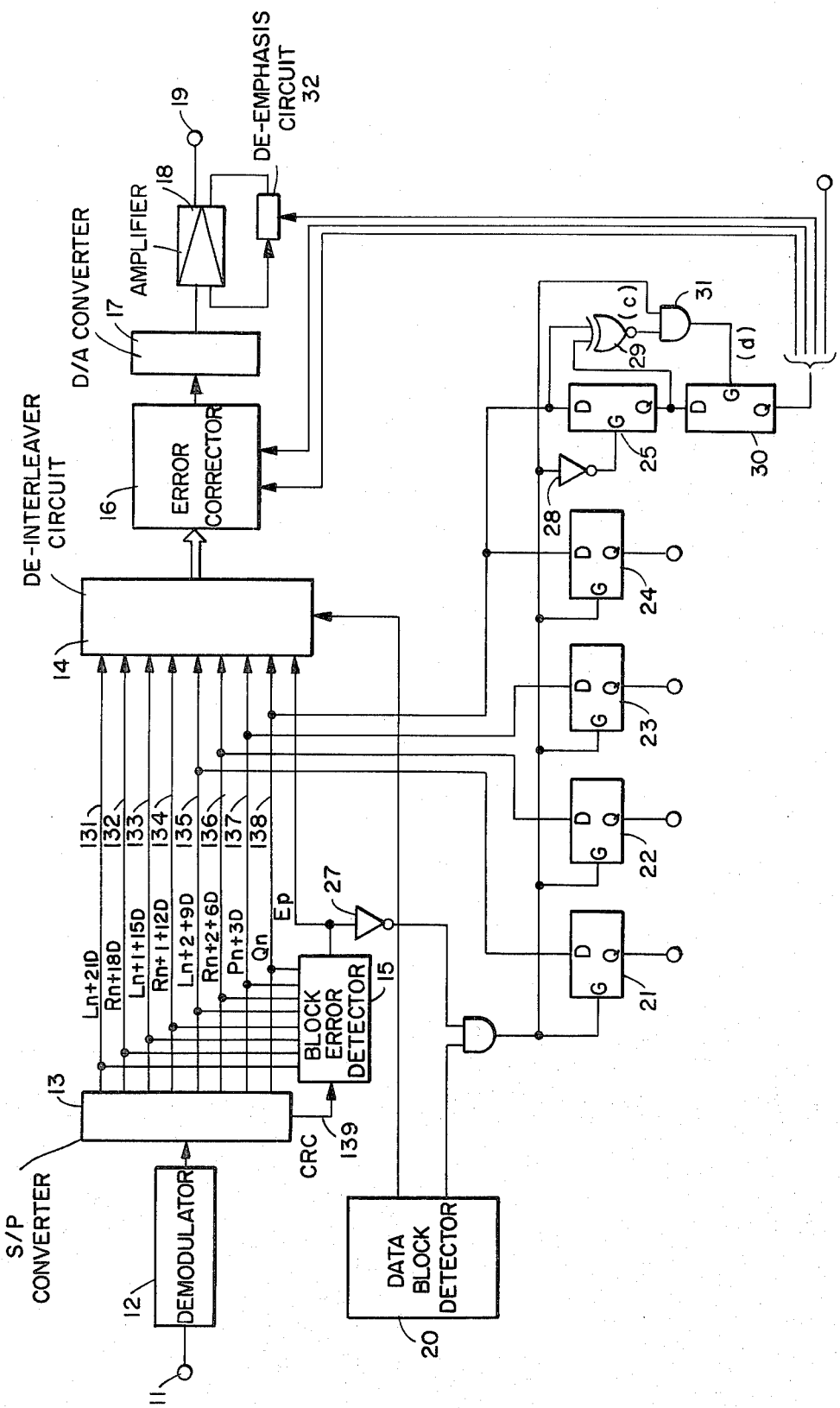
FIG. 5 shows a block diagram of one embodiment of a PCM signal processor according to the present invention.

FIG. 5 shows a block diagram for one embodiment of a PCM audio signal decoder of the present invention. Control signals and modulated PCM audio signals reproduced from a VTR (not shown) are applied to TV signal demodulator 12 through terminal 11.

When the TV signal contains a data block (FIGS. 1 or 3), demodulator 12 extracts the data block, including the PCM data words, shown in FIGS. 1 or 3, and shapes their waveforms. The extracted data block is then applied to serial-to-parallel converter (hereinafter "S/P converter") 13 where the data block is divided into 14-bit words: $L_{n+21D}$, $R_{n+18D}$, $L_{n+15D}$, $R_{n+1+12D}$, $L_{n+2+9D}$, $R_{n+2+6D}$, $P_{n+3D}$, $Q_n$ and a 16-bit CRC. These words are outputted from nine parallel output lines sets 131 through 139 of S/P converter 13.

Line sets 131–138 in the preferred embodiment have 14 lines and connect to de-interleave circuit 14. The six data words, $L_{n+21D}$ through $R_{n+2+6D}$, and the two check words, $P_{n+3D}$ and $Q_n$, are thus inputted to de-interleave circuit 14.

De-interleave circuit 14 comprises several delay circuits, by which seven of the words, $L_{n+21D}$, $R_{n+18D}$, $L_{n+1+15D}$, $R_{n+1+12D}$, $L_{n+2+9D}$, $R_{n+2+6D}$, $P_{n+3D}$ are delayed by amounts 7D through D, respectively. Check word $Q_n$ is not delayed. By the delays, de-interleave circuit 14 presents the data and check words $L_n$, $R_n$, $L_{n+1}$, $R_{n+1}$, $L_{n+2}$, $R_{n+2}$, $P_n$ and $Q_n$, in parallel and simultaneously.

The six data words, $L_{n+21D}$, $R_{n+18D}$, $L_{n+1+15D}$, $R_{n+1+12D}$, $L_{n+2+9D}$ and $R_{n+2+6D}$, and the two error correction check words $P_{n+3D}$ and $Q_n$ are applied to block error detector 15 together with the error detection CRC check word.

Block error detector 15 detects the existence of any errors in the control data block using the CRC check word. Block error detector 15 then generates error pointer Ep indicating the presence or absence of such errors.

The de-interleaved PCM words from de-interleave circuit 14 are applied to error correction 16 where standard error correction is practiced for data words $L_n$, $R_n$, $L_{n+1}$, $R_{n+1}$, $L_{n+2}$ and $R_{n+2}$. The word "correction" in this application also includes compensation. The corrected data words from error corrector 16 are then inputted to digital-to-analog converter (hereinafter "D/A converter") 17, and the resulting analog audio signals are amplified by amplifier 18 and applied to output terminal 19.

When the TV signal contains a control data block shown in FIG. 2, that signal is demodulated and the control data block contained in the signal is applied to S/P converter 13. The output signals of S/P converter 13, however, are sent to a different destination. The 56-bit heading signal word S appears on output line sets 131 through 134, each line set carrying 14 bits; the 14-bit content discrimination signal word T appears on output line set 135; the 28-bit address signal word U appears, divided into two 14-bit words, on output lines sets 136 and 137; and the 14-bit control signal word CT appears on output line set 138. The 16-bit error detection CRC word on output line 139 is processed by the block error detector 15 in the same way that the CRC word for the data block in FIG. 1 is processed.

Data block detector 20 controls de-interleave circuit 14 to decode PCM data blocks (e.g., those in FIGS. 1 or 3) but not control data blocks (e.g., the one in FIG. 2). In the preferred embodiment of the invention shown in FIG. 5, de-interleave circuit 14 is connected to data block detector 20 by a single signal line. When data block detector 20 detects in the vertical field a control signal data block (See FIG. 2), detector 20 places a pulse signal of a logic "1" on this signal line to tell de-interleaver 14 to stop operation. The pulse signal lasts for one horizontal period.

When this signal is present, data flip-flop registers (hereinafter D-FFs) 21–25 are brought into play. The words T, U and CT outputted from S/P converter 13 are introduced to the D input terminals of D-FFs 21 through 25. In the preferred embodiment, D-FF 21 would latch word T, D-FFs 22 and 23 would latch word U, D-FF 24 would latch the first ten bits of words CT and D-FF 25 would latch the trailing 4 bits of word CT. The outputs of D-FF's 21–25 are then used to contain the control signals for the PCM signal processor of this invention. D-FF's 21–23 are each fourteen bits wide, D-FF 24 is ten bits wide and D-FF 25 is four bits wide.

The gate or clock input of D-FFs 21–24 is the output of AND gate 26. The clock input of D-FF 25 is the complement of the other D-FF clock inputs since D-FF 25's clock input is connected to the output of AND gate 26 via inverter 28.

AND gate 26 has two inputs. One input is a signal from data block detector 20 and the other input is error pointer Ep after is passes through inverter 27.

An error pointer equal to a logic "0" is generated from block error detector 15 when there are no errors in the control data block. That logic "0" is changed to a logic "1" by inverter 27 and the output of inverter 27 is applied to AND gate 26. If the data block detector 20 is outputting a logic "1" signal to AND gate 26, a logic "1" signal from inverter 27 will cause a logic "1" at the output terminal of AND gate 26, which will in turn cause D-FFs 21 through 24 to latch the signals at their input terminals. Thus words T, U and the leading 10 bits of CT appear on output terminals Q of D-FFs 21 through 24, respectively.

When there are errors in the control data block, block error detector 15 generates a logic "1" for the error pointer. This causes the output of AND gate 26 to become "0" because the output of inverter 27 is "0." Consequently, D-FF's 21 through 24 will not latch the words T, U and the leading 10 bits of CT on their respective D input terminals, so D-FF's 21 through 24 continue to hold the data that they inputted the last time their gate was at a logic "1." The output of FF's 21–24 containing the words T, U and the first 10-bits of word CT are thus controlled by block error detector 15.

The explanation of D-FF's 25 and 30 and gates 29 and 31 must be prefaced by the observation that although only one of each of the above-mentioned elements is shown in FIG. 5, there are actually four identical sets of such elements, each connected to a separate line from line set 138.

As explained above, the gate inputs of D-FF 25 receive the complement of the output of AND gate 26. The inputs of D-FF 25 are connected to the lines 138 from S/P converter 13 which contain the last four bits of the CT signal. The signals on these lines are also each connected to one input terminal of one of the EQUIVALENCE gates 29. Each D-FF flip-flop having an input connected to one of the EQUIVALENCE gates 29 also has an output connected to the other input of the same EQUIVALENCE gate. Each output of a D-FF 25 flip-flop is also connected to the input of a different D-FF 30 flip-flop.

Each output terminal of EQUIVALENCE gates 29 connects to an input terminal of a different AND gate 31. The other input terminal is connected to the output terminal of AND gate 26, which contains the gate signal for D-FFs 21–24. The output of AND gates 31 is the gate signal of D-FF 30.

Thus, in an error condition when D-FF's 21–24 do not latch, neither does D-FF 30. Preferably, the Q output terminals of the first flip-flop of D-FF 30 would be the copy inhibition code listed on Table 1. The Q output terminals of the second and third flip-flops of D-FF 30 would, in the preferred embodiment, contain the P and Q correction discrimination codes and would be connected to control terminals of error corrector 16. In the preferred embodiment, the output of the fourth flip-flop of D-FF 30 output contains the pre-emphasis discrimination code and is connected to de-emphasis circuit 32 added to amplifier 18. De-emphasis circuit 32 provides frequency equalization characteristics for amplifier 18, and in the preferred embodiment, is a resistor-capacitor circuit.

When the output of AND gate 26 is a logical "1," D-FF 25 does not latch the trailing 4 bits of CT appearing at its D input terminal and instead keeps the data it latched the last time AND gate 26's output was at logical "0." When AND gate 26 is at "0" the output of D-FF 25 becomes equal to its inputs.

The output of EQUIVALENCE gates 29 is at logic "1" when both of its input signals, the input and output of a D-FF 25 flip-flop, are the same; that output is at logical "0" when its input signals are different.

When the output of EQUIVALENCE gate 29 is "0," D-FF 30 fails to latch the output of D-FF 25 regardless of the state of the gate 26 because the G input of D-FF 30 is at a logic "0." When this occurs, D-FF 30 outputs the data it held previous to its gate signal becoming a logic "0," despite what new signals appear on its D input terminal. Consequently, when the input and output of D-FF 25 disagree with each other, indicating a change in control signal, the decoder is controlled by the previous control signal.

As indicated above, EQUIVALENCE gates 29 output a logic "1," when the input data and output data of D-FF 25 agree with each other. Thus, the output data of D-FF 25 is latched into D-FF 30 if the output of AND gate 26 is a logic "1" and if the input and output of D-FF are the same. This ensures that the decoders are always controlled by control data signals which have been extracted at least twice in a row from the latest field of the TV format signal.

Therefore, in the above embodiment, the copy inhibition code, the P correction discrimination code, the Q correction discrimination code and pre-emphasis discrimination code, which each seriously affects the decoding operation for the PCM audio signal, are checked for disabling errors. Although the transmission of new control signals is delayed by one frame due to the decoder of this invention, the PCM signal processor of this invention ensures that random errors in the PCM control signals do not adversely affect the signal processor's operation.

It will be apparent to those skilled in the art that various modifications and variations can be made in the PCM signal processor of this invention. It is intended that the present invention cover the modifications and variations provided that they come within the scope of the appended claims and their equivalents.

I claim:

1. A pulse code modulation (PCM) signal processor for extracting signal processor control words from a serial PCM data stream also containing error detection and correction words, said PCM signal processor comprising:

serial-to-parallel converter means for converting said serial PCM data stream into a parallel form, said serial-to-parallel converter means including terminals for outputting said signal processor control words and said error detection and correction words;

error detecting means responsive to said control words and said error detection and correction codes and connected to said serial-to-parallel converter means terminals for forming an error signal having a first state indicating the presence of an error in said control words and a second state indicating the absence of an error in said control words;

first means coupled to said serial-to-parallel converter means for storing first signal processor control signals from said signal processor control words when said error signal is in said second state and for preventing the storage of said first signal processor control signals when said error signal is in said first state; and second means connected to said serial-to-parallel converter means for storing second signal processor control signals from said signal processor control words when said error signal is initially in said first state and subsequently in said second state and when said second signal processor control signals from signal processor control words of two successive PCM data streams are equivalent, said second storing means thereby reducing the chance of erroneous operation by the receipt of random errors in PCM control signals by ensuring that second signal processor control signals be the same in two successive PCM data streams before storage of said signals.

2. The PCM signal processor in claim 1 wherein said PCM data stream contains either all signal processor control words or all PCM data words, wherein said PCM signal processor also contains means coupled to said PCM data stream for determining when said PCM data stream contains all signal processor control words, and wherein said error detecting means is connected to said determining means and forms said error signal in said second state when there is no error in said signal processor control means at the same time that said determining means determines that said PCM data stream contains all signal processor control words.

3. The PCM data storage means in claim 2 wherein said first and second storing means include D-type flip-flop registers.

4. The PCM signal processor in claim 3 wherein said transient error correction means includes two sets of D-type flip-flop registers sequentially connected.

* * * * *